March 8, 1932.   M. ADAMCIKAS ET AL   1,848,511
VENTILATION OF DYNAMO ELECTRIC MACHINES
Filed July 21. 1931   3 Sheets-Sheet 1

M. Adamcikas
G. Massera
INVENTORS

By: Marks & Clerk
ATTYS.

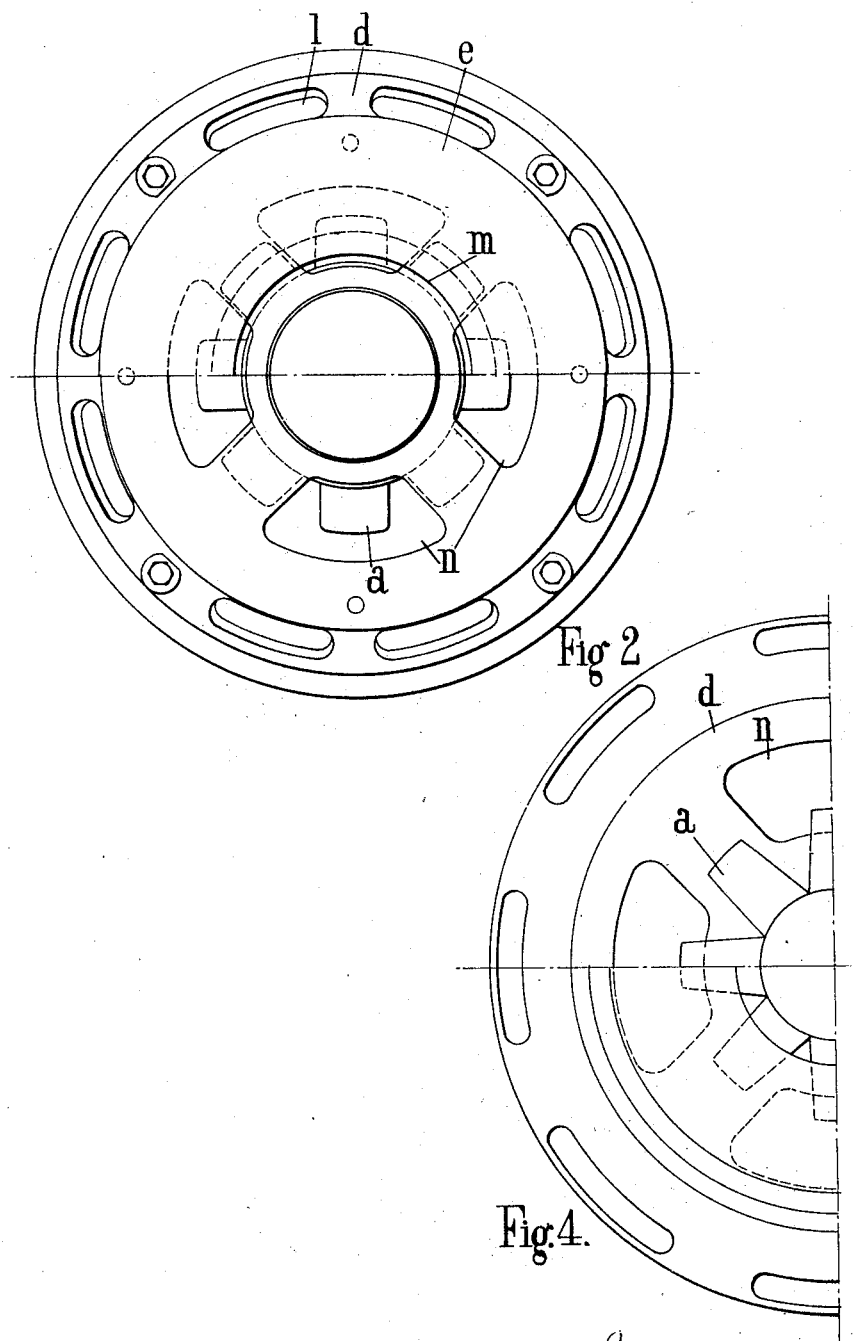

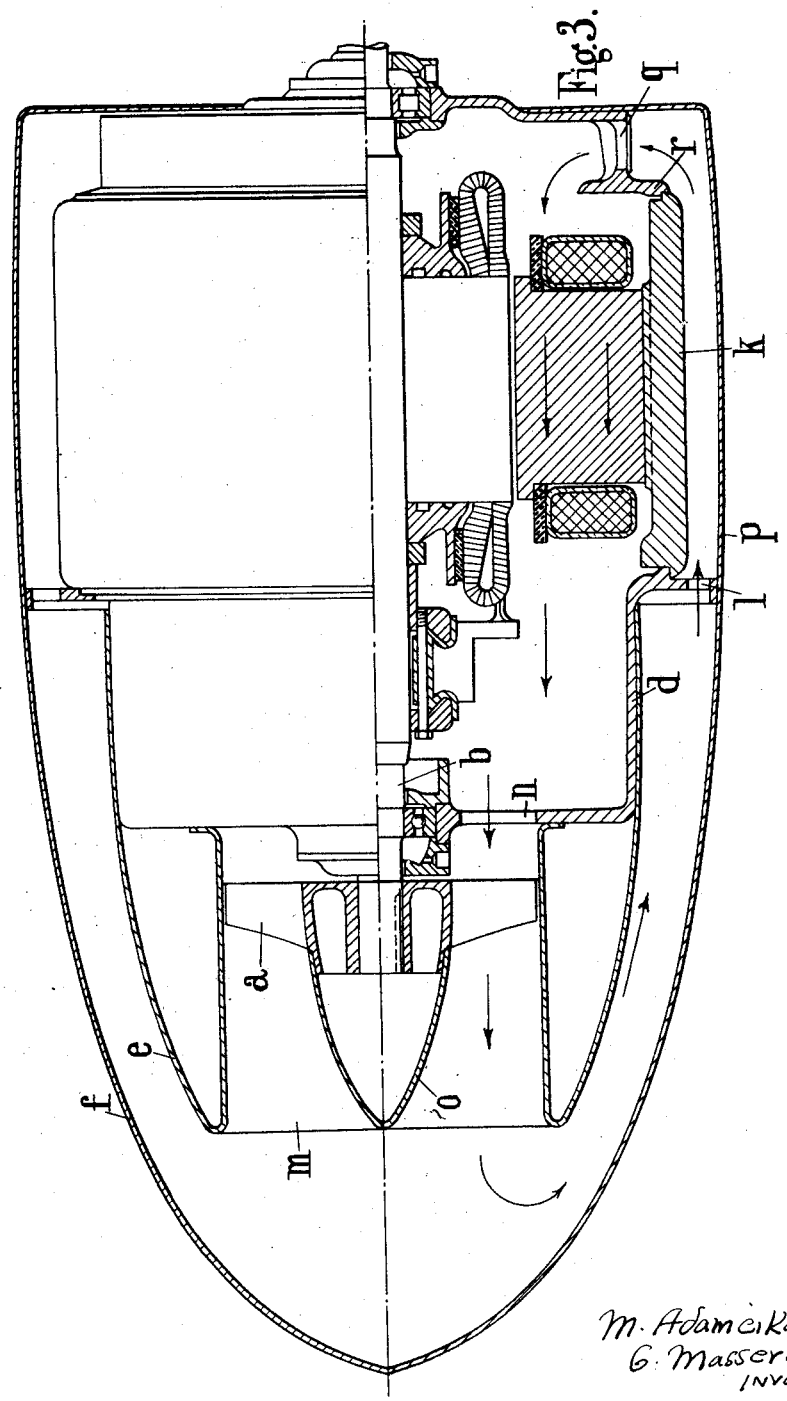

Patented Mar. 8, 1932

1,848,511

UNITED STATES PATENT OFFICE

MYKAS ADAMCIKAS AND GIUSEPPE MASSERA, OF ALDWYCH, LONDON, ENGLAND

VENTILATION OF DYNAMO ELECTRIC MACHINES

Application filed July 21, 1931, Serial No. 552,223, and in Great Britain March 8, 1930.

This invention relates to improvements in the ventilation of enclosed dynamo electric machines by means of a fan producing a circulation of air or gas for the purpose of removing excessive heat.

According to the present invention use is made of a fan of the propeller type capable of producing an axial flow of air and of thin end covers of good thermal conductivity, viz. an external end cover and an internal cowl concentrically surrounding one another, between which the air is caused to circulate in addition to its circulation through the machine, the said two end covers being attached to the exterior of one end of the machine casing.

In some electrical machines the path of the air or gas circulated through the machine may be completed by an annular passage between the casing of the machine and a thin metal cover of good thermal conductivity surrounding the said casing and forming a continuation of the external end cover along the inner surface of which the air or gas circulates.

The fan which is mounted on the shaft of the electric machine may lie within or outside the casing of the machine.

The invention also consists in the constructions hereinafter described, by way of example, with reference to the accompanying drawings, in which:

Figures 1 and 2 are respectively a sectional elevation and an end view of one form of construction, the upper half of Figure 2 showing the outer end cover removed while in the lower half both the outer end cover and the inner cowl between which the air is caused to circulate are removed.

Figures 3 and 4 show similar views of a second form of construction, in which, however, the upper half in Figure 4 is shown with the outer cover and the inner cowl removed, whilst in the lower half only the outer cover is removed.

Figure 1:
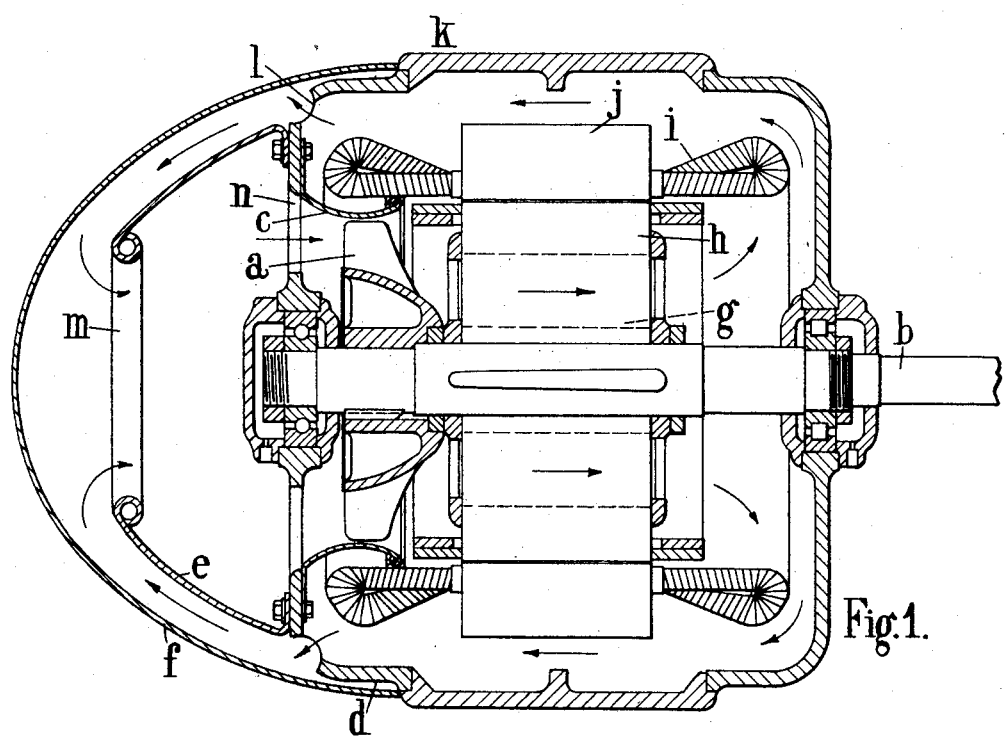

Referring to the form of construction illustrated in Figures 1 and 2, $a$ is a propeller fan of the axial flow type mounted within the casing of the electric machine, $b$ the shaft of the electrical machine on which the fan is mounted, $c$ the fan casing, and $d$ an end bracket. $e$ is a thin internal cover or cowl, and $f$ a thin external cover, both made of a material of good thermal conductivity, preferably of sheet metal. The cowl $e$ and external cover $f$ are preferably of elliptical shape; it is, however, to be understood that they may also be made cylindrical or conical.

By means of the fan $a$ the air is caused to circulate through passages $g$ in the squirrel cage rotor $h$, past the end windings of the field coils $i$, past the stator core $j$, between the latter and the casing $k$ of the electric machine, through the holes $l$ in the end bracket $d$, through the passage formed between the cowl $e$ and the outer cover $f$, through the end opening $m$ in the cowl $e$ and through the holes $n$ in the end bracket $d$ to the fan $a$.

Referring to the form of construction illustrated in Figures 3 and 4, the fan $a$ is mounted outside the casing $k$ of the electric machine, $o$ being a fairing of thin sheet metal or the like and $e$ and $f$ respectively a cowl and an outer cover, both made of a material of good thermal conductivity, the said cover forming a continuation of an external thin cover $p$ also of good heat conducting material, which cover $p$ surrounds the casing $k$ of the electric machine from the cover $f$ to the opposite end of the machine, in such a manner as to leave a space between it and the said casing for the completion of the circuit of the air or gas.

In this form of construction the fan $a$ causes the air to circulate through the cowl $e$, out of its opening $m$, through the passage formed between the cowl $e$ and the outer end cover $f$, through the holes $l$ in the end bracket $d$, through the passage formed between the casing $k$ of the electric machine and the cover $p$, through holes $q$ in the end bracket $r$, through the interpolar spaces $g$, through the end bracket $d$ and through the holes $n$ in the latter to the fan $a$.

We wish it to be understood that the details for carrying the invention into effect may be modified without in any way departing from the spirit of the invention.

What we claim is:—

1. The combination with a dynamo electric machine, of a metal casing confining the machine and annularly spaced therefrom to provide an air passage about the live parts of the machine, said casing having an open end and a closed end, a cover closing the open end, a cowl supported within the cover and spaced therefrom, said cowl having a central opening, the cover and cowl being formed from metal of a thickness less than the thickness of the casing, an axial flow fan operated by the machine to force air axially therethrough, and through said air passage and the space between the cowl and cover into the central opening.

2. A device as claimed in claim 1 wherein the cowl is supported by a bracket connected to the casing, said bracket having fluid conducting openings therein communicating with the air passage.

In testimony whereof we have signed our names to this specification.

MYKAS ADAMCIKAS.
GIUSEPPE MASSERA.